United States Patent [19]

Selby, III

[11] Patent Number: 5,024,474
[45] Date of Patent: Jun. 18, 1991

[54] LOCKING CAM LATCH MECHANISM

[75] Inventor: Howard W. Selby, III, Boulder, Colo.

[73] Assignee: Selsys Corporation, Boulder, Colo.

[21] Appl. No.: 425,862

[22] Filed: Oct. 24, 1989

[51] Int. Cl.$^5$ .............................................. E05C 19/00
[52] U.S. Cl. .................................... 292/252; 292/140; 403/317
[58] Field of Search ............... 292/252, 254, 140, 143, 292/197, 200, 333; 403/317

[56] References Cited

U.S. PATENT DOCUMENTS

| 1,032,889 | 7/1912 | Freund | 292/252 |
| 1,045,981 | 12/1912 | Robertson | 292/333 |
| 3,014,745 | 12/1961 | Kytta | 292/252 |
| 3,473,835 | 10/1967 | Boyriven | 292/252 X |
| 3,731,837 | 5/1973 | Platts et al. | 292/252 X |
| 4,483,639 | 11/1984 | McCandless, II | 292/252 X |

FOREIGN PATENT DOCUMENTS 229052 2/1925 United Kingdom ................ 292/252

Primary Examiner—Eric K. Nicholson
Attorney, Agent, or Firm—Francis A. Sirr; Earl C. Hancock

[57] ABSTRACT

A latch mechanism includes a cylindrically shaped rotating cam having a small radius portion and a large radius portion that are spaced from each other along a circumference of cylinder. A ball is seated against the cam. The ball is forced outward when it is seated in the small radius portion of the cam, and is allowed to move inward when it is seated in the large radius portion of the cam. A first hollow latch pin is provided, having an indentation at one point on the outer surface thereof into which the ball can seat. A second smaller size latch pin, also having an indentation in one point on the outer surface thereof into which the ball can seat, is insertable within the first hollow latch pin, to thereby allow multiple objects to be secured by the latch mechanism. A housing supports and facilitates movement of the cam, the ball and the two latch pins.

8 Claims, 2 Drawing Sheets

LOCKING CAM LATCH MECHANISM

BACKGROUND OF THE INVENTION

1. Field of Invention

This invention relates generally to a locking latch mechanism and specifically to a simplified latch mechanism which is appropriate in applications in which space is a premium.

2. Description of Prior Art

Most latch assemblies allow the connection of only two objects and generally are too big and cumbersome for application in portable electronic devices where space is a premium.

It would be desirable to have a simplified latch mechanism that had very few moving parts so that it could be used in applications in which space is a premium and light weight is important.

In view of the foregoing, it is an object of this invention to provide a simple latch mechanism that uses very few parts.

It is a further object of this invention to provide a latch mechanism which when in the locked position holds the objects to be latched securely in place.

It is a further object of this invention to provide a latch mechanism that is light weight.

It is yet a further object of this invention to provide a latch which can hold several items in place at one time using the same lever mechanism.

SUMMARY OF THE INVENTION

These and other objects of the invention are accomplished in accordance with the principles of the invention by use of a rotatable cam mechanism that positions a bolt to secure a latch pin when the cam is in the closed position and which repositions the bolt when in the open position so allowing the latch pin to be removed from the latch mechanism. The latch pin is attached to one item to be connected while the cam mechanism is housed in another item to be connected. Because multiple latch pins can be inserted within one another, multiple objects can be connected with a single cam mechanism.

The invention involves a simple locking latch mechanism by which two or more objects may be joined together in a locked fashion and then separated when the latch is released. One object to be joined contains a cam shaft which when rotated to a closed position offsets a bolt. The other object to be joined contains a latch pin with an oval opening that partially captures and is secured by the bolt when the latch cam is in the closed position.

When the latch cam is rotated to the open position, the bolt is no longer offset and retracts from the oval opening in the latch pin, allowing the latch pin to be rotated and/or removed.

Further features of the invention, its nature and various advantages will be more apparent from the accompanying drawings and the following detailed description of the invention.

DETAILED DESCRIPTION OF THE PREFERRED EMBODIMENT

Figure 1:
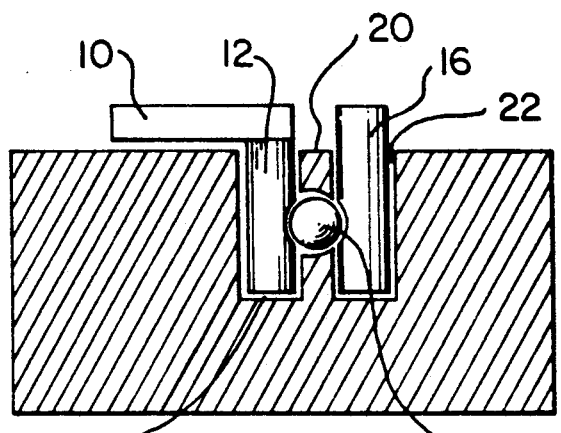
FIG. 1 is a cross-sectional side view showing the relationship between the latch handle and cam shaft, the bolt and the latch pin.

Referring now to the drawings, there is shown in FIG. 1 a cross-section drawing of the latch handle 10, which is connected to the latch cam shaft 12, the bolt, which in the preferred embodiment is ball shaped and referred to hereinafter as the ball 14 and the latch pin 16. The latch cam shaft is contained in a cam shaft guide 18, the ball moves within a ball guide 20, and the latch pin is housed in the latch pin guide 22. Ball guide 20 is constructed and arranged to freely allow limited operative movement of ball 14, and also operates to prevent ball 14 from falling out of guide 20 when latch pin 16 is vertically removed from latch pin guide 22.

Figure 2A:
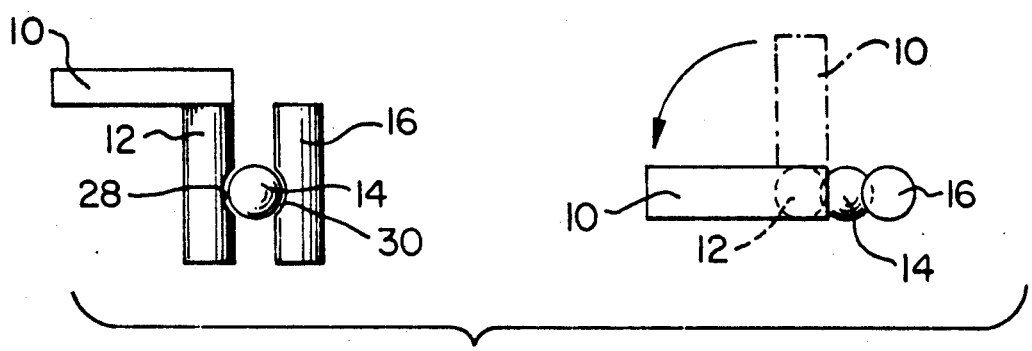
FIG. 2 A and B show cross-sectional top and side views of the latch mechanism in the closed and open position respectively.
Figure 2B:
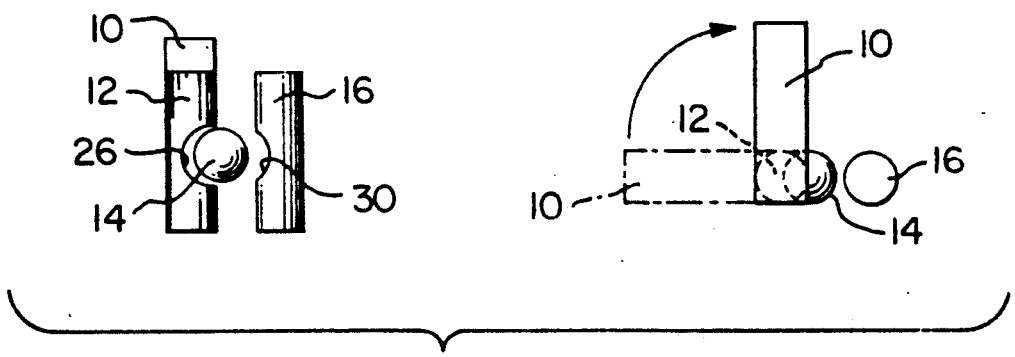

The latch cam shaft 12 is cylindrical and rotates within the latch cam shaft guide 18. FIG. 2A shows a side and top view of the latch cam shaft 12 in the closed position. When in this position, the ball 14 is seated in the shallow portion 28 of the latch cam shaft, which forces the ball into the notch 30 on the latch pin 16 locking it in place. When the latch handle 10 is moved to the open position as shown in FIG. 2B, the latch cam shaft 12 is rotated 90 degrees. This positions the ball 14 in the deep portion 26 of the latch cam shaft which causes the ball to disengage from the notch 30 on the latch pin allowing the latch pin, and whatever object is attached to it, to be removed.

Figure 3A:
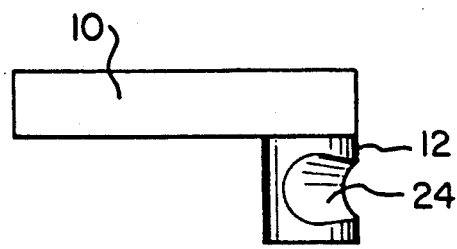
FIG. 3 is a cross-sectional drawing of the latch handle and cam shaft.
Figure 3B:
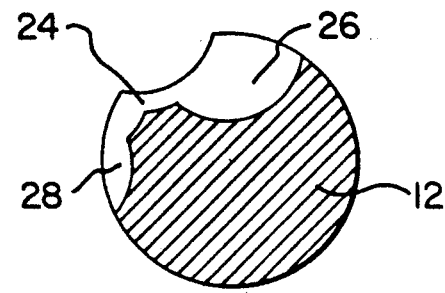

The cam in the latch cam shaft 12 consists of a grove cut in the shaft. FIG. 3A and B show the latch cam shaft 12 and the cam 24 that is formed in the shaft 12. FIG. 3A is a cross sectional side view of the latch handle 10, latch cam shaft 12 and cam 24. FIG. 3B is a top view of the cam shaft 12 showing relative positions and depths of the cam 24. Position 26 on the cam is the deepest portion of the cam which represents the open position of the latch mechanism. The closed position 28 which is the shallowest portion of the cam is ninety degrees from position 26.

Figure 4A:
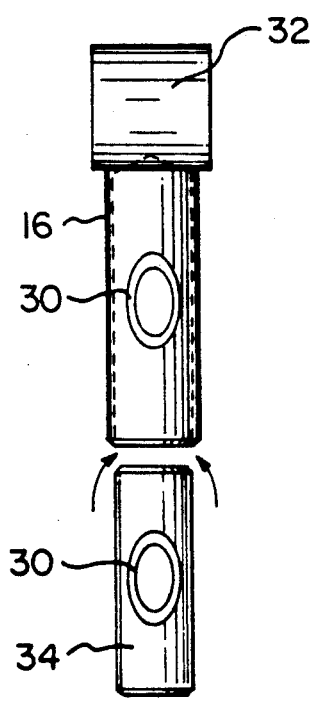
FIG. 4 is a cross-sectional drawing of the latch pin.
Figure 4B:
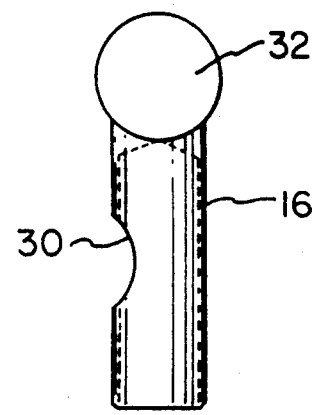

FIG. 4A is a cross-sectional front view of the latch pin 16, which is hollow in the interior, and showing the notch 30 in which the ball seats when in the closed position. FIG. 4A also shows a second latch pin 34 which can be inserted within the first latch pin 16 which second latch pin is also secured by the ball. FIG. 4B is a cross-sectional side view showing the notch 30 in which the ball seats when in the closed position.

The latch pin can be structured so as to provide a positioning capability with respect to the housing which supports said latch pin. For example, the latch pin could contain a channel or detent that mates with a ridge within the supporting housing so that the latch pin is inserted with the proper alignment.

The latch pin top 32 is shown in FIG. 4A and B as a cylindrical element It could be any shape that is suitable to connect the latch pin to the object to be latched and to the object that houses the latch handle and latch cam shaft.

I claim:

1. A latch mechanism comprising:
   a. a cylindrically shaped rotating cam having a cylindrical outer cam surface, and having a small radius portion and a large radius portion that are circumferentially spaced from each other along said cam surface;

b. a bolt seated against said cam surface and movable outward relative to said cam surface when seated in said small radius portion of said cam surface and movable inward relative to said cam surface when seated in said large radius portion of said cam surface;

c. at least one latch pin with an indentation in at least one point on the outer surface into which said bolt can seat; and d. housing means to support and facilitate movement of said cam, said bolt and said latch pin.

2. A latch mechanism according to claim 1 wherein said bolt is ball-shaped.

3. A latch mechanism according to claim 2 including guide means supported by said housing means, and cooperating with said ball-shaped bolt as said ball-shaped bolt moves inward and outward relative to said cam surface.

4. A latch mechanism according to claim 3 wherein said cylindrically shaped cam includes handle means to facilitation rotation of said cylindrically shaped cam to thereby selectively bring said small radius portion or said large radius portion thereof into seating relation with said ball-shaped bolt.

5. A latch mechanism comprising:

a. a rotatable cam having a cylindrical surface, said cam having a small radius portion and a large radius portion that ar spaced from each other along said cylindrical surface;

b. a bolt seated against said cam, said bolt being forced outward when seated in the small radius portion of said cam, and said bolt being allowed to move inward when seated in the large radius portion of said cam;

c. a first hollow latch pin having an indentation on the outer surface thereof into which said bolt can seat;

d. a second smaller size latch pin having an indentation on the outer surface thereof into which said bolt can seat, said second latch pin being insertable within said first hollow larger latch pin, to thereby allow multiple objects to be secured by said latch mechanism; and e. housing means to support and facilitate movement of said cam, said bolt and said latch pins.

6. A latch mechanism according to claim 5 wherein said bolt comprises a ball.

7. A latch mechanism according to claim 6 including guide means supported by said housing means, and cooperating with said ball as said ball moves inward and outward relative to said cylindrical cam surface.

8. A latch mechanism according to claim 7 wherein said rotatable cam includes handle means to facilitation rotation of said cam to thereby selectively bring said small radius portion or said large radius portion thereof into seating relation with said ball.

* * * * *